UNITED STATES PATENT OFFICE 2,497,469

FLEXIBLE ABRASIVE ARTICLES

Norman P. Roble, Lewiston, N. Y., assignor to The Carborundum Company, Niagara Falls, N. Y., a corporation of Delaware No Drawing. Original application May 20, 1940, Serial No. 336,212. Divided and this application May 19, 1943, Serial No. 487,621

2 Claims. (Cl. 51—301)

This application is a division of a copending application of Benner, Ball, Roble and Rossow, Serial No. 336,212 (abandoned), filed May 20, 1940, as a continuation-in-part of an application of Benner, Ball, Roble and Rossow, Serial No. 137,796 (abandoned), filed April 19, 1937. The application is filed by Norman P. Roble, one of the joint applicants above named, and is directed to his invention of flexible abrasive coated articles having binders comprising sodium silicate and proteinaceous material such as casein.

Heretofore, in the process of manufacturing coated abrasive articles by affixing abrasive coatings on backs such as those of paper and/or cloth, it has been customary to use glue or varnish as an adhesive. More recently they have been using as an adhesive various synthetic resins as solutions in organic solvents or in liquid form. Such resins are, however, expensive and other adhesives have been desired.

Flexible abrasive articles are usually constructed by applying to a backing, which may be paper, cloth or a composite sheet of both paper and cloth, a layer of adhesive usually known as a making coat. Abrasive grain such as particles of garnet, alumina, silicon carbide, mullite is then applied to the making coat. Another application of adhesive known in the art as a sizing coat is thereupon applied.

Soluble silicate solutions may be used as an adhesive for the above mentioned uses. For example, sodium silicate solutions which have a specific gravity of about 1.68 and a $Na_2O:SiO_2$ molecular ratio of about 1:2 are useful for this purpose. Solutions of sodium silicates of other molecular ratios can also be used to good advantage with proper adjustment of the specific gravity and viscosity of the solutions for this and other purposes. These solutions may be prepared from a single silicate or from a mixture thereof. Silicate solutions may be used in applying both the making coat and the sizing coat or either of these and may also be used in bonding the individual layers of a composite backing.

Improved results may be obtained by applying to the coated article a treatment which will render the silicate adhesive harder, tougher and more resistant to moisture. A convenient and effective treatment which has been used employs the application of heat to the coated article to bring about a loss of water from the silicate.

As an example of a heat-treatment using a baking operation, it has been found that good results may be obtained by air-drying the abrasive products coated with a silicate solution such as that previously described for a period of about 18 hours and then subjecting the products to temperatures of 225° F., 260° F., and 300° F. for successive periods of 2 hours each. In some cases, lower temperatures and/or shorter baking times should be used to avoid embrittlement.

This heating or baking may be done in an oven or heated chamber of any suitable design. It will be clear that the necessary time of heating and the temperature applied will vary depending upon the characteristics of the silicate adhesive used and the use to which the article is to be put. The proper conditions will be easily determined, however, when it is considered that it is desired to obtain the maximum resistance to humidity and moisture in the silicate film and the maximum service. It is not desirable to have the teperature exceed 300° F. for more than a very short time when cellulosic backings are used.

It has been determined that a silicate solution such as the one above mentioned will, after being baked as a film under the conditions specified above, have a moisture content of approximately 20 per cent.

Flexible abrasive articles on which such silicate solutions have been employed as adhesives are entirely satisfactory in use, abrasive discs and belts which have been tested being superior, as determined in an abrading test, in respect to the amount of material removed over a period of several hours, as compared to the stock removal of commercial articles bonded with the usual adhesives.

The soluble silicate adhesives may be heat treated in other ways if desired. For example, by coating a flexible backing with a soluble silicate adhesive and abrasive grain, allowing the silicate to air dry, applying a sponge rubber pad to the coated side, and heating the sheet for a few minutes to a temperature of from 335° F. to about 350° F. while holding it under a pressure, which may be about 1000 lbs./in.² or less, sufficient to prevent bloating or intumescence of the silicate film, an abrasive article is obtained which compares favorably with commercial samples of glue bonded and resin bonded similar articles in abrasive action and durability. Suitable hot calendering procedure may be used instead of a hot pressing process to obtain similar results.

A modification of the procedure set forth in the preceding paragraph may also be used in the formation of composite backings. Sheets or webs of paper and/or cloth and/or vulcanized fiber may be caused to adhere by hot pressing them together if one of the sheets or webs is provided with an adherent air-dried soluble silicate film. The silicate film under the influence of the high temperature and pressure appears to act as though it were thermoplastic and good adhesion between the sheets or webs is obtained.

It is frequently desired to provide an abrasive article which, in addition to resistance to the influence of atmospheric humidity, will also have a resistance to water. It has been discovered that a high degree of water resistance can be imparted to such improved silicate bonded flexible abrasive articles by coating the article with a thin film of a protective substance which is preferably waterproof.

This coating may be applied in various ways, as by spraying or brushing the material on the surface of the abrasive article. As an example, a thin solution of the protective material has been prepared and the abrasive article dipped in the solution. A thin uniform coating can easily be obtained in this way. The protective coating may be applied after the baking or, if the protective material is not harmed by the baking temperatures, the coating may be applied before baking.

As examples of protective materials which can be used there may be mentioned lacquers, varnishes, drying oils, solutions of rubber in organic solvents, latex solutions, solutions of natural and synthetic resins in organic solvents, solutions of gums, waxes, such as paraffine, synthetic wax-like products, such as chlorinated naphthalenes, and organic silicates such as ethyl ortho-silicate.

Such synthetic resins as the paracumarone-indene and phenolic-aldehyde condensation product resins have also been found to be particularly well-adapted for use in imparting water-resistance to abrasive articles of the herein described type.

Other resins which may be applied as a protective coating are vinyl resins, such as polyvinyl acetate resins, polyvinyl alcohol-acetal resins, and alkyd resins, which may be modified with oils or fatty acids if desired or convenient.

The coating of the protective material may be very thin, thus lending the silicate film additional resistance to humidity or, by using a somewhat thicker coating, a practically complete resistance to the action of water may be obtained. Such coatings, whether thick or thin, result in substantial absence of any efflorescence of the silicate film due to the action of the carbon dioxide and moisture of the air.

Reduction in the efflorescence of silicate bonded flexible abrasive articles may also be effected by reducing the tendency of the surface to react with the carbon dioxide and moisture of the air. It has been found that soluble silicates of low alkali content do not effloresce as readily as do those of higher alkali content. While in some cases low alkali silicates are not as satisfactory as the higher alkali silicates for the making coat in the manufacture of silicate bonded flexible abrasive articles, it has been discovered that such silicates may be used satisfactorily for the sizing coat with resultant reduction in efflorescence. It has been also determined that potassium silicate is less susceptible to the disfiguration of efflorescence than is sodium silicate and accordingly a film of resistant potassium silicate may be used as a sizing over films of sodium silicate or potassium silicate alone may be used as the adhesive.

In the following examples the manufacture of abrasive discs in accordance with the present invention is described. It is not intended, however, that these examples should be considered other than as exemplary and it will be recognized that not only may the methods set forth for making discs be varied in accordance with the disclosure but that other flexible abrasive articles such as abrasive belts, abrasive paper and cloth sheets and rolls and the like may be produced by similar or appropriately modified methods.

*Example I*

Cloth of the kind ordinarily used in making abrasive cloth is sized with a silicate solution of somewhat less alkalinity than that mentioned in the first portion of this specification. After being air-dried the sized cloth and a sheet or web of fiber or paper are combined, using a silicate of good adhesive quality as an adhesive, and then passed through heated calender rolls.

To the thus obtained backing a heavy coat of 36 grit alumina abrasive grain is applied in any suitable way using a making coat of about the alkalinity and specific gravity mentioned in the first portion of this specification, i. e., about 1.68 specific gravity and $Na_2O:SiO_2$ ratio about 1:2, slightly thinned with water if necessary.

A sizing coat of the same type as the making coat but thinner is then applied over the grain and the sheets or webs cured by heating for about 5 hours at temperatures between 150° and 175° F. followed by about 6 hours at about 200° to 225° F.

If desired a mildly reactive filler such as clay may be added to either the making or sizing coats or both to assist in setting up the silicate films. The amount added may range from about 10% to about 40%.

Abrasive discs made according to this example had excellent abrasive qualities with long retained high cutting rate.

*Example II*

Instead of the combination backing used in Example I a sheet or web of vulcanized fiber about .025 to .03 in. thick is used. A making coat of about 1.7 specific gravity silicate solution having a $Na_2O:SiO_2$ ratio of about 1:2.5 is used and is slightly thinned with water before application to the backing.

After the abrasive grain is applied a sizing coat of about the same characteristics is applied and the coated sheet or web is cured by being subjected to a temperature of about 125° F. for 12 hours, about 175° F. for 3 hours and about 225° F. for 8 hours.

The abrasive discs made by this method are also excellent.

In connection with the examples given above it will be realized that preliminary air drying at a low humidity or low temperature heating will reduce the curing time necessary. Furthermore, since to a considerable extent the time and temperatures used in drying the silicate coated articles are interrelated, the time of cure may be shortened by using somewhat higher temperatures. It should be remembered, however, that the cellulosic backings are harmed by too-high temperatures and in general temperatures above about 250° F. are undesirable.

The use of phenolic-aldehyde condensation products in conjunction with soluble silicate adhesives is of particular interest since it has been found that such resins when applied in solution or in the liquid "A" stage before the baking are cured and hardened to a very high degree during this baking in contact with the silicate. Such complete curing is a novel and unpredictable result since the time of cure, which may be as little as 4 hours, is much shorter than that ordinarily necessary for producing the same degree of curing in the lack of contact with the silicate. The temperatures used are also lower than those ordinarily employed.

This cure-accelerating property of a soluble silicate may be utilized in various other ways as by using a soluble silicate film as a presize for the backing, as a making coat, as a sizing coat, as a very thin layer over the sizing coat, as a thin layer between the making and sizing coat, or in a combination of these ways. The remainder of the adhesive used may be a phenolic-aldehyde condensation product resin with or without modifying agents and which may be in admixture with other adhesives which do not interfere with the curing of the phenolic resin.

As another variation of a coating employing phenolic-aldehyde condensation product resins, it has been found that a resin of this type, such as "Durite S1719," admixed with a powdered soluble silicate is valuable as a sizing coat on a flexible abrasive article having a silicate making coat. Upon baking the article 1 hour at 225° F. and 1 hour at 300° F., this coating becomes sufficiently cured to give very satisfactory results. Various combinations of liquid and solid phenolic-aldehyde condensation product resins with liquid and powdered soluble silicates may also be used.

Modifications of the procedures set forth above may be employed as by the use of mixtures with other adhesives, inert fillers, reactive materials, plasticizers, extenders, etc.

Among the additional adhesives which may be used with the silicates are the proteinaceous ones such as glue, casein, blood albumen and the proteins obtained from corn, soya beans, and the like. Also usable are resins such as alkyd and phenolic resins, which may be modified in the well known manner with oils or fatty acids. and vinyl resins such as polyvinyl alcohol.

Other adhesives which may be used in admixture with the silicates are lacquers, starch solutions, solutions of water-soluble gums such as gum arabic and Egyptian gum, latex, rubber solutions, alkaline resin solutions, emulsions or dispersions of lacquers and varnishes, solutions of water and alkali-soluble cellulose derivatives such as methyl cellulose, ethyl cellulose, cellulose xanthate, cellulose glycolate, cellulose aceto-glycolate, cupro-ammonium cellulose, and the like, aqueous emulsions or dispersions of resins such as phenolic, alkyd, urea-formaldehyde, vinyl and acrylic resins. Powdered soluble silicates or silicate esters such as methyl and ethyl silicates may also be used.

These additional or modifying adhesive may be admixed with the soluble silicate adhesives singly or a plurality may be used together wherever compatible. It should be remembered, however, that the modifying adhesive or adhesives used must be chosen with due regard for the type of film desired and the treatment which is to be given the coated article.

The physical properties of the coatings may be modified in various ways as, for example, by the addition of flexibilizing agents to the silicate solutions. Among such agents which can be used are polyhydric alcohols such as glycerol, mannitol, sorbital and diethylene glycol, polyhydric alcohol-boric acid resins such as glycerol or glycol bori-borate, alkaline resin solutions, aqueous emulsions or dispersions of flexible resins, and organic alkalies such as triethanolamine. As will be noted, certain of these flexibility modifying agents also possess adhesive properties and the use thereof will assist in the bonding of the abrasive grains.

Fillers may also be incorporated in the soluble silicate adhesives herein described. The fillers may be inert inorganic ones such, for example, as powdered silica or organic ones such as cellulosic fibers. Particularly good results may be obtained by the use of a highly porous filler such as cork dust with soluble silicate adhesives. Such fillers permit a very slow, gradual breaking away of the dulled abrasive grit so that the cutting rate of the abrasive article is better maintained.

As it is frequently desired to modify the water resistance, activity, hardness and other properties of soluble silicate films reactive materials may be used as agents for this purpose. These materials may be solids, as for example fillers, or they may be liquids, solutions, or solids such as phenol and tannic acid. The latter may also be used in solution if desired.

Among the reactive fillers which may be used are oxides, such as those of zinc, magnesium, boron and those of the alkaline earth metals, hydroxides, such as those of magnesium and the alkaline earth metals, clay, Portland cement and various forms of calcium carbonate. These fillers react with the soluble silicates producing a thickening and a considerable resistance to the action of water. Such reactive materials may be utilized in various ways depending upon the results desired and the nature of the materials used.

A simple and effective way of securing the advantages arising from the use of reactive materials is to merely admix them with the soluble silicate adhesives. This method may be used to advantage with reactive fillers.

It is sometimes desirable, however, to localize the action of the reactive material and this may be done in a number of ways, the suitability of any particular way being determined by the result wanted. Thus, reactive fillers may be bound to the abrasive grains, using a small amount of binder, or reactive glasses or ceramic material may be sintered or fused on the surface of the abrasive grains. As other alternatives, reactive fillers may be dusted over the abrasive grain and the making coat, over the sizing coat, or may be caused to adhere to the backing as by a suitable adhesive, such as a thin starch solution, before the making coat is applied. It will be understood that various combinations of these methods may be utilized, in this way obtaining a plurality of what may be termed zones of reaction.

Among the liquids which may be used as reactive agents are solutions of acid salts of the alkali metals, soluble salts of all metals except the alkali metals, concentrated solutions of ammonium salts and ammonium hydroxide, and mineral acids. These liquids may be applied in any convenient way, as by spraying, painting, rolling, or dipping, to the backing, the making coat, or the sizing coat or to a plurality of these. It will be understood that such liquids may also be used in conjunction with reactive or inert fillers if desired.

Other reactive materials may be used which are so slowly reactive that the silicate solution is not undesirably thickened in mass before application.

Such materials include salts of organic acids such as heavy metal tartrates and amino salts and the salts of higher molecular carboxylic acids and sulfonic acids, e. g., naphthalene sulfonic acid.

It has also been found that flexible abrasive articles such as discs can be strengthened or reinforced by applying to them a coating of a soluble silicate. This coating may be applied to articles bonded with glue, varnish, resin or the like, or to the improved silicate bonded articles of the present invention. The reinforcing coating may be applied by any suitable means and may extend over the whole area of the article if desired, though it has been found that an annular coating around the periphery of an article such as a disc is productive of improved results. Such a coating may be applied to only one or to both sides of the article and may be of any desired thickness.

By the expression "soluble silicate" as used herein, is meant the water-soluble silicates of the alkali metals. The ones most commonly used are silicates of sodium but it is not desired to be limited to these since all soluble silicates are capable of being used satisfactorily in the practice of the present invention.

While the invention has been set forth in some detail and has given a number of examples, it is not desired to be limited thereby except as limited by the scope of the appended claims.

I claim:

1. A bonded heat-resistant abrasive article of the coated abrasive type comprising abrasive particles bonded to a flexible backing by a binder comprising a uniform mixture of casein and a sodium silicate cement.

2. A bonded heat-resistant abrasive article of the coated abrasive type comprising abrasive particles bonded to a flexible backing by a binder comprising casein and sodium silicate.

NORMAN P. ROBIE.

REFERENCES CITED

The following references are of record in the file of this patent:

UNITED STATES PATENTS

| Number | Name | Date |
|---|---|---|
| 230,202 | Sibley | July 20, 1880 |
| 1,777,162 | Biddle | Sept. 30, 1930 |
| 1,814,768 | Rippey et al. | July 14, 1931 |
| 2,089,426 | Richmond | Aug. 10, 1937 |